United States Patent [19]

Maemoto et al.

[11] Patent Number: 4,499,040
[45] Date of Patent: Feb. 12, 1985

[54] PRODUCTION OF STAMPED PLASTIC SHEET

[75] Inventors: Kenichi Maemoto, Osaka; Katsushi Jinno, Ehime, both of Japan

[73] Assignee: Nissen Chemical Industries Co., Ltd., Ehime, Japan

[21] Appl. No.: 369,771

[22] Filed: Apr. 19, 1982

[30] Foreign Application Priority Data

Apr. 20, 1981 [JP] Japan .................................. 56-60345
Oct. 30, 1981 [JP] Japan ................................ 56-214867
Jan. 25, 1982 [JP] Japan .................................. 57-10449

[51] Int. Cl.³ ............................................. B29C 17/02
[52] U.S. Cl. ...................................... 264/167; 264/28; 264/46.1; 264/210.3; 264/210.4; 264/210.5; 264/286; 264/289.3; 425/369
[58] Field of Search ....................... 264/1.6, 28, 210.2, 264/210.5, 177 R, 284, 280, 288.4, 292, 167, 46.1, 210.3, 210.4, 285, 286, 289.3; 425/385, 369

[56] References Cited

U.S. PATENT DOCUMENTS

| 3,038,205 | 6/1962 | Plummer | 264/177 R |
| 3,104,937 | 9/1963 | Wyckoff et al. | 264/210.1 |
| 3,233,029 | 2/1966 | Rasmussen | 264/288.4 |
| 3,290,420 | 12/1966 | Orser | 264/210.2 |
| 3,333,032 | 7/1967 | Dickinson | 264/22 |
| 3,496,262 | 2/1970 | Long et al. | 264/177 R |
| 3,574,809 | 4/1971 | Fairbanks et al. | 264/177 R |
| 3,619,454 | 11/1971 | Sakata | 264/216 |
| 3,676,537 | 7/1972 | Winstead | 264/177 R |
| 3,886,250 | 5/1975 | Danko | 264/177 R |
| 3,911,187 | 10/1975 | Raley | 264/280 |
| 3,963,813 | 6/1976 | Keith | 264/292 |
| 4,039,609 | 8/1977 | Thiel et al. | 264/210.5 |
| 4,070,435 | 1/1978 | Lewicki, Jr. | 264/284 |
| 4,079,114 | 3/1978 | Bonner | 264/284 |
| 4,153,664 | 5/1979 | Sabee | 264/280 |
| 4,211,743 | 7/1980 | Nauta et al. | 264/284 |
| 4,234,530 | 11/1980 | Thiel et al. | 264/210.5 |

FOREIGN PATENT DOCUMENTS

| 47-36015 | 9/1972 | Japan | 264/280 |
| 53-3454 | 1/1978 | Japan | 264/210.2 |

Primary Examiner—James Lowe
Attorney, Agent, or Firm—Sughrue, Mion, Zinn, Macpeak, and Seas

[57] ABSTRACT

A stamped plastic sheet manufacturing method includes immersing a molten extruded thermoplastic sheet into a liquid refrigerant just prior to passing through a pair of stamping rolls having tooth-like or vane-like projections. In this manner, a skin layer is formed on the surface of the molten plastic sheet prior to stamping. Upon stamping, the sheet is tensioned by the confronting crests of the above tooth-like or vane-like projections and then removed from the liquid refrigerant after the interior of the sheet has been hardened to form a stamped sheet having a substantially uniform thickness.

4 Claims, 26 Drawing Figures

the following figure shows…

PRODUCTION OF STAMPED PLASTIC SHEET

BACKGROUND OF THE INVENTION

This invention relates to a novel and simple method of producing a stamped plastic sheet of high utility in which a thermoplastic plastic film or sheet (hereinafter referred to merely as a "sheet") is permanently stamped, and to a novel and useful stamped plastic sheet provided by the method.

In general, in stamping a plastic sheet, a sheet-shaped or cylinder-shaped molten thermoplastic material extruded from the nozzle of a T-die, screw die or circular die is allowed to pass through the clearance or gap between stamping rolls such as embossing rolls, so as to be pressed while being heated, kept warm or cooled. Especially in manufacturing an uneven, wavy sheet, the sheet should be stamped while the core of the sheet is soft. Accordingly, in the case of the thin sheet, the temperature must be strictly controlled before it is stamped. On the other hand, in the case of the thick sheet, two contradictory conditions must be satisfied; that is, while it requires substantial time to soften the sheet to the core, the stamped sheet must be quickly cooled down to its heat distortion temperature. Thus, stamping a thick sheet is more difficult than stamping a thin sheet. In stamping a thick sheet, it is necessary to reduce the stamping speed to an uneconomical speed, or to provide an additional means such as special cooling rolls. In the latter case, the cooling rolls must be precise, and an additional mechanical problem, namely the synchronization in pitch of the unevenness of the cooling rolls is involved.

SUMMARY OF THE INVENTION

A primary object of this invention is to solve the above-described problems accompanying conventional methods of manufacturing stamped sheets.

Another object of the invention is to provide a novel method in which a film is formed and stamped in a single process.

A further object of the invention is to provide a method of readily manufacturing a thick plastic sheet which is of stable quality.

A still further object of the invention is to provide an excellent shock absorbing sheet which is special in configuration and structure.

DETAILED DESCRIPTION OF THE PREFERRED EMBODIMENTS

The invention involves a process wherein a film-shaped molten thermoplastic material is supplied into the gap between a pair of confronting stamping rolls set in a liquid refrigerant, and is continuously subjected to stamping by stamping rolls while the core of the material is soft although a solidified skin layer has been formed on the surface of the material. The rolls are provided with a plurality of tooth-like projections which intermesh with sufficient spacing so that only the crests of the teeth engage the material thereby subjecting the remaining material to a tensioning action.

Examples of the thermoplastic plastic employed in the invention are polyesters, such as polyethylene terephthalate; polyamides, such as Nylon 6; polyolefins, such as polyethylene, polypropylene and polystyrene, and the copolymers thereof; and polyvinyl halogenides, such as polyvinyl chloride and polyvinylidene chloride.

The stamped sheet manufactured by the method of the invention may be a solid sheet which is not foamed, or a foamed sheet which is obtained by extruding, at high temperatures, with the above-described thermoplastic plastic materials added to a foaming agent. Furthermore, the method of this invention is applicable to a process for so-called "fiber-reinforced plastics" which include glass fiber or carbon fiber. In the former case, the foamed sheet itself is low in heat conductivity; however, stamping can be readily achieved because, in the method of the invention, foaming and sheet formation are carried out substantially at the same time. In the conventional method, it is difficult to stamp the above-described FRP sheet if it has been cooled and solidified; however it can be readily stamped according to the method of the invention. Pigments such as titanium dioxide, fillers such as talc, plasticizers, weather resisting agents and/or thermal-deterioration preventing agents may be added, if required.

The molten plastic material is preferably supplied to the stamping rolls directly from an extrusion die such as T-die, screw die or circular die. However, it may be supplied through rolls which maintain the sheet material to be stamped molten. The stamping rolls are generally set in the liquid refrigerant to the engagement line thereof; however, it is preferable that the engagement line of the stamping rolls are positioned substantially at a level of refrigerant surface in order to obtain sharp and accurate stamped products. The liquid refrigerant is, in general, water; however, it may be low aliphatic alcohols or hydrophilic solvent such as polyethylene glycol, or mixtures of the former and the latter.

The molten resin material may be introduced directly into the liquid refrigerant, or it may be introduced into the liquid refrigerant after being guided onto the surface of a drum. The latter method is advantageous in that the degree of "neck-in" is reduced. Even when the molten plastic material is introduced directly into the liquid refrigerant, problems such as foaming are scarsely caused. Stamping conditions such as the temperature of the liquid refrigerant, the time between extrusion and the stamping operation, and the arrangement of the stamping rolls are essential; however, they cannot be simply determined because they depend on the kind of resin employed, the thickness of the sheets, the atmospheric temperature, etc. For instance, the temperature of the liquid refrigerant is in the range of from 0° C. to 100° C., preferably lower than 60° C. The lower the liquid refrigerant temperature, the higher the cooling effect. Generally, as the liquid refrigerant temperature decreases, the stamping speed must be increased. The position of rolls in the refrigerant and a temperature thereof are important factors effecting the cooling rate and stamping accuracy. They complicatedly affect the properties of the final product. For example, in the case of a polypropylene sheet, it becomes transparent or opaque depending upon the above described specific factors.

In the method of the invention, a variety of stamping rolls may be employed patterns which are to be formed on the sheets. One pair of stamping rolls are employed. It is an essential feature of the present invention that the stamping rolls used herein are much different from conventional stamping rolls, which have concave and convex uneven parts completely engageable with each other, and they have tooth-like or vane-like projections which intermesh with sufficient spacing between each other so that a film shaped molten plastic material supplied into the clearance of the both rolls is peculiarly tensioned by the interaction of the crests of said projections and a liquid refrigerant existing at the vicinity of the engaged point so as to give a novel stamped sheet as hereinafter described.

When stamping is carried out with the above-described rolls under the condition that the uneven surfaces are not completely engaged with each other, the resultant sheet is tensioned by the convex parts of the rolls because of the skin layer on the surface of the film-shaped molten plastic material supplied to the rolls. If, in this case, the roll is of the type where recesses are formed everywhere on the wavy ribs, the sheet is tension by the protruding parts on either side of each recess, as a result of which a unique stamped sheet is obtained which is concave at the recesses. This stamping mechanism is completely different from conventional ones for thermoplastic plastic. In injection molding, stamping is carried out by the pressure of resin filled in the cavity between the two metal molds; in calendering, embossing is effected by pressing resin between a pair of rolls; in thermo-forming, stamping is carried out with a resin film being brought into contact with the inner surface of a mold on the negative pressure side by a pressure difference; and in a sizing system, stamping is carried out under local pressure in a clearance of a sizing plate or sizing mandrel. Thus, these methods are fundamentally differernt in mechanism from the stamping method according to the invention, which utilizes a tensioning action.

The reason why the invention utilizes the novel stamping mechanism tensioning action is that, because of the cooling effect of the refrigerant, the formation of the skin layer on the surface of the molten plastic material and the solidification of the core of the latter occur successively within a very short period of time.

It is preferable that the sheet from the stamping rolls is moved in the refrigerant along a tangential line which touches the rolls at a stamping point (at which the rolls engage each other). In this case, even a rigid stamped sheet having ribs extending in the direction of movement thereof can be formed substantially free from distortion or twist. The direction of the tangential line is not strictly critical. That is, if the sheet is moved at less than 30°, preferably less than 10°, with respect to the tangential line, excellent results can nonetheless be obtained.

What is most interesting in practical use among the various stamped sheets manufactured by the method of the invention is a stamped sheet, the ribs of which are formed by the aforementioned pitching action and are divided everywhere.

FIGS. 1 through 3 show typical examples of the uneven surface pattern and structure of the above-described stamped plastic sheet according to the invention. More specifically, parts (a) and (b) of FIGS. 1 through 3 are front and rear views of the sheets, respectively. Parts (c) of these figures are sectional views taken along the lines A—A, C—C and E—E in FIGS. 2(a) and 3(a), respectively. FIGS. 1(d), 2(d) and 3(d) are also sectional views taken along the lines B—B, D—D and F—F respectively. As shown in FIGS. 1 through 3, the patterns are formed with various parts which are different in configuration and level. In each of FIGS. 1 through 3, reference symbols O, X and Δ designate those parts which are at the highest, lowest and middle levels, respectively, so that a peak (or an edge), a valley and a hill can be readily distinguished from one another. Further in FIGS. 1–3(a) and (b), the width direction of the sheet is indicated by the double-head arrow.

In the example shown in FIG. 1, ribs 1 and 1′ are provided alternately at equal intervals in such a manner that they are parallel with width direction of the sheet. On the front side of the sheet, each rib 1 is divided by a plurality of hill parts 2 which are relatively small and are arranged at equal intervals, thus forming separate peaks 3. The sheet has a plurality of valley parts 4 which are in the form of elongated grooves, which form the peaks or ridges 1a′ of the rear side (FIG. 1(b)). The top surface of each such ridge is substantially flat. Such a sheet can be formed by using rolls having corresponding parallel tooth-like projections which are provided with regular spaced apart recesses.

In the example of FIG. 2, the sheet has a plurality of ribs 1 and 1′ which are parallel with one another and are arranged at equal intervals. The ribs form about 15° angles with respect to the width direction of the sheet. On the front side, each rib 1 is divided by hill parts 2 which are relatively large in width, thus forming individual peaks 3. The sheet has valley parts 4 which, similarly as in the example of FIG. 1, are elongated grooves which are the ridges 1a′ of the rear side. Similarly as in the example of FIG. 1, the top surface of each ridge is substantially flat. The second example shown in FIG. 2 is similar to the first example shown in FIG. 1 except that the ribs are inclined with respect to the width direction of the sheet. Both of the examples belong to a type where one of the ribs on both sides is divided by hill parts, thus forming peaks. Such a sheet can be formed using rolls having corresponding parallel tooth-like projections inclined to the axis of the rolls and provided with regularly spaced recesses.

In the third example shown in FIG. 3, the sheet has ribs 1 and 1′ which extend at 45° and 135° angles with respect to the width direction of the sheet. Peaks are formed at the intersections of the ribs 1 and 1′. A valley part is surrounded by four adjacent ribs. Each peak part 3 on the front rises, forming a valley part 4 on the rear side. In this example also, the top surface of each peak 3 and the bottom surface of each valley are substantially flat. Such a sheet can be formed using rolls having mutually intersecting tooth-like projections provided with regularly spaced recesses.

In the three above-described examples, each valley 4 between two adjacent peaks 3 is made concave, thus serving to disperse any pressure applied to the flat peaks. In the case where, as shown in FIG. 1, the hill parts separating the peaks 3 are perpendicular to the direction of ribs, the hill parts form auxiliary ribs connecting the ribs 1 and 1' as viewed from the rear side (FIG. 1(b)). Therefore, elongation perpendicularly of the ribs 1 and 1' is considerably limited, and accordingly impact withstanding characteristics are remarkably improved. In the example shown in FIG. 3, since the ribs are intersected, elongation is limited in all directions, and therefore the compression resisting force is much larger than that of the sheet shown in FIG. 1.

Figure 1A:
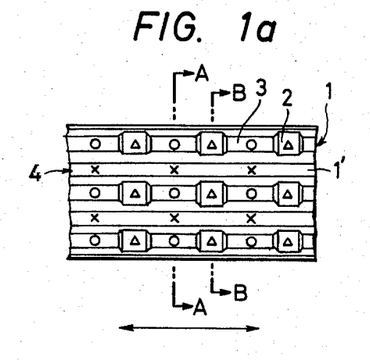
FIGS. 1 through 3 are diagrams showing plan and side views of three typical examples of a shock absorbing sheet manufactured according to the method of the invention.
Figure 1B:
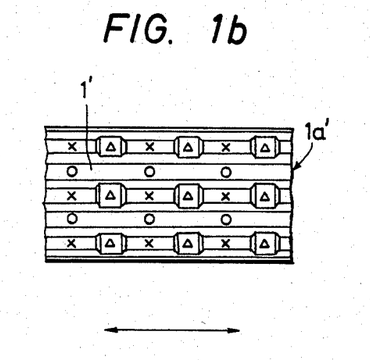
Figure 1C:
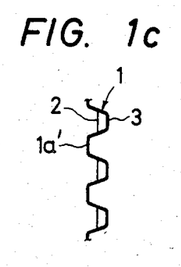
Figure 1D:
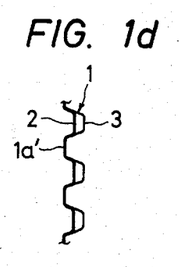
Figure 2A:
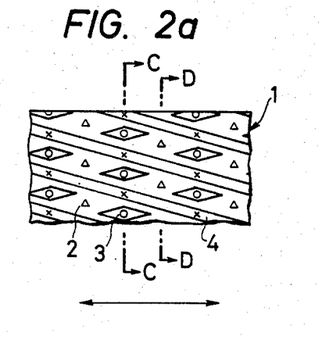
Figure 2B:
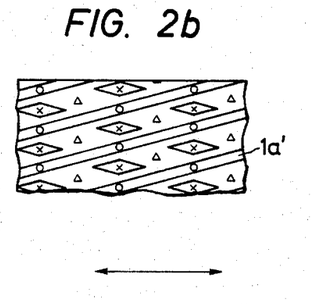
Figure 2C:
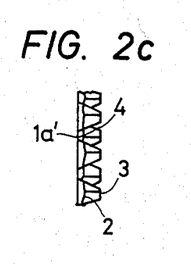
Figure 2D:
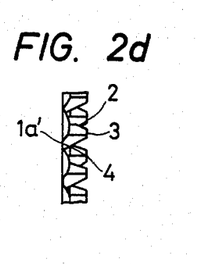
Figure 3A:
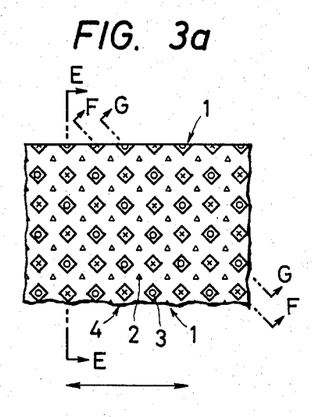
Figure 3B:
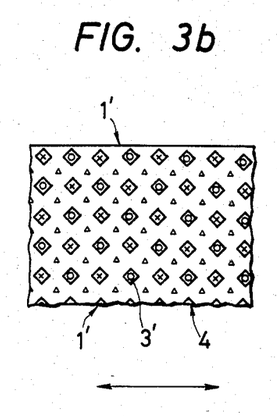
Figure 3C:
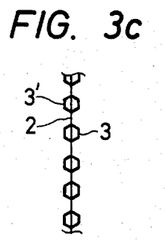
Figure 3D:
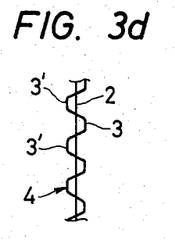
Figure 3E:
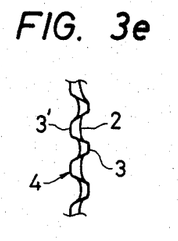
Figure 4:
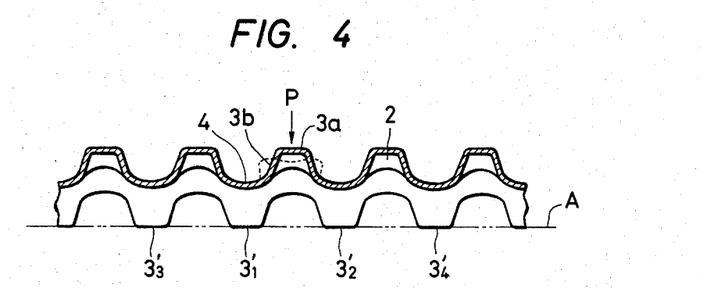
FIG. 4 is an enlarged view of a sectional view of the sheet taken along the line E—E of FIG. 3a, for describing the effect thereof.

In the sheet according to the invention, the top surfaces of the ribs and/or the peaks are made as flat as possible. As is apparent from FIG. 4, which is an enlarged sectional view of the sheet shown in FIG. 3, a compression force P indicated by the arrow deforms the top portion $3a$ of the peak 3 as indicated by the dotted line; however, the compression force is transmitted to an article A via the valley parts 4 and two peaks $3_1'$ and $3_2'$ on the opposite side. Therefore, the compression force P is reduced to one quarter ($\frac{1}{4}$) as transmitted to the article A, because four peaks (including two more peaks (not shown) on the article side) are involved in absorbing the force. In practice, the flat top portion $3a$ of the peak 3 to which the force is directly applied undergoes brittle fracture, whereby the larger part of the energy is absorbed. Accordingly, the force applied to the peaks $3_1'$ and $3_2'$, etc. becomes much smaller. While the top portion $3a$ of the peak 3 receives the compression force P, the boundary portion between the top portion and the middle portion $3b$ is acutely bent, as a result of which brittle fracture occurs more readily. Since the hill part 2 between the peaks is concave as described before, the peak will not be broken completely by the compression force; that is, a part of the compression force will be transmitted successively through the hill part 2 and the valley parts 4 to the other peaks, hill parts and valleys adjacent thereto. Thus, the sheet is an excellent shock absorber.

The effect of the sheet has been described with reference to the case where a compression force is applied to only a point on the sheet. However, it will be understood that the same effect is obtained when a compression force is applied to a line on the sheet or to a surface of the sheet. In the latter case, the shock absorbing effect is increased because the compression force is borne by more peaks. The sheet shown in FIG. 3 is sufficiently flexible in any direction, and thus has great utility as a shock absorbing sheet.

The shock absorbing sheet shown in FIG. 1 is suitable for wrapping relatively long articles such as a fluorescent tubes, because it is quite flexible in the longitudinal direction thereof. The sheet is scarcely expanded in the longitudinal direction, and a number of peaks support any compression force. Therefore, the shock absorbing effect thereof is much higher than that of a conventional shock absorbing material.

The shock absorbing sheet shown in FIG. 2 is also considerably flexible in the longitudinal direction thereof, and the peaks expecially are bendable in the width direction. Therefore, any impact is greatly absorbed by brittle fracture and flexibility.

In addition to the three examples described, many other examples of the sheet can be provided according to the invention. These examples are in common with one another in that ribs are arranged regularly in predetermined directions on one or both sides, and that, in the case where the ribs are provided on one side only, they are divided by a number of recessed parts, and in the case where the ribs are provided on both sides, the ribs on at least one side are divided by a number of recessed parts, the individual peaks which are formed by the division with the recessed parts being connected to one another through concave hill parts.

In the above-described example, the top surface of each peak is flat; however, it is not always necessary to make the top surface flat, as the case may be. For instance, even if the top surface of each peak in FIG. 3 is formed hemispherically, the shock absorbing effect through deformation and brittle fracture can be sufficiently obtained.

The direction of the ribs should be suitably determined according to the use of the sheet. However, in general, in the case where the sheet is used to wrap a long article in the form of a cylinder, the ribs should extend in the width direction of the sheet or in the longitudinal direction of the same, or the ribs should extend with an angle of 10° with respect to the widthwise or longitudinal directions when they are formed somewhat inclined. On the other hand, in the case where the sheet is used to wrap an article along the longitudinal direction and the widthwise direction thereof, it is most suitable, as shown in FIG. 3, to provide ribs which interset at right angles, or ribs which intersect forming 45° and 135° angles with respect ot the widthwise direction or the longitudinal direction. The sheet having the ribs extending in the width-wise and longitudinal directions is slightly lower in flexibility in the widthwise and longitudinal directions than is the above-described one. However, even in the case of the sheet shown in FIG. 1, which is low in flexibility in the widthwise direction, the flexibility can be substantially improved by providing flexing ribs, as indicated by reference numeral 6 in FIGS. 9 through 11, which are arranged at predetermined intervals in the longitudinal direction.

In the case where the sheet is formed by means for continuously producing sheets (to be described hereafter), the pitch of the ribs is practically limited by the desired height of the ribs, i.e., the thickness of the finished sheet (not the thickness of the material for forming the sheet). As the rib's height is increased, the rib's pitch is necessarily increased. If the height of the ribs is large, then the shock absorbing capability is increased to some extent; however, not only is the sheet thickness increased, but also the sheet is weakened with respect to point compression forces or line compression forces which are applied to the intermediate portion between the adjacent ribs. Therefore, in practice, it is preferable that the height of the ribs be set to 5 mm or less, preferably 1 to 3 mm, and the thickness and hardness of a sheet material are selected to give the sheet the necessary rigidity. The thickness of the sheet itself, in general, ranges from about 0.05 mm to about 0.3 mm. The term "sheet" is used herein in the broader sense, and includes thinner films as long as the latter can provide the same effects.

The configuration of the peak portions of the sheet according to the invention is not particularly limited; however, they are generally circular truncated cones truncated quandrangular pyramids, semi-spheres, prisms or cylinders. Furthermore, the configuration of the peaks may be a trapezoid which is substantially a parallelogram in section.

Figure 5:
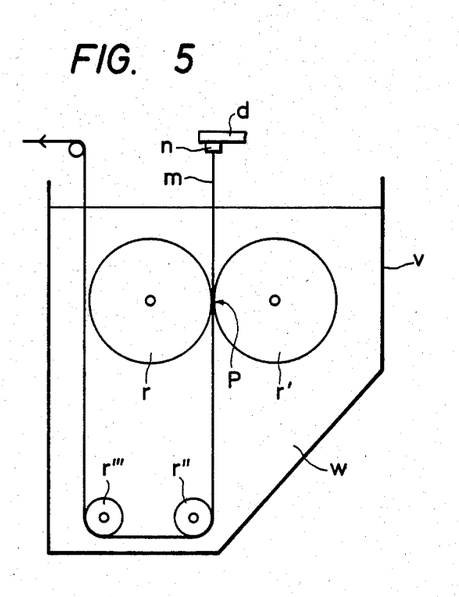
FIGS. 5 and 6 are explanatory diagrams showing examples of the method according to the invention.

FIG. 5 shows one example of a stamped sheet formation method according to the invention. A slit-shaped nozzle n of a die d extrudes molten plastic material m, which is introduced in the form of a sheet into the liquid refrigerant W in a container v. The molten plastic material m thus introduced is shaped while passing through the gap between a pair of stamping rolls r and r'. An uneven pattern is formed on the outer wall of at least one of the stamping rolls r and r'. The uneven pattern is stamped on the sheet surface while the plastic material m passes through the gap between the stamping rolls. The sheet thus stamped is moved in the direction of a tangent line extending from a stamping point in the gap between the stamping rolls r and r' substantially without being pulled. After being cooled and solidified to the core, the stamped sheet is pulled out of the liquid refrigerant bath v, while the direction of movement of the sheet is being changed by a guide roller r'' whose outer wall is tangent to the aforementioned tangent line, and by another guide roller r'''. The sheet thus extracted is subjected to after-treatments such as thermal setting and drying in a conventional manner.

In this method, stamping is effected before the molten plastic material is solidifed to the core. Therefore, stamping is achieved momentarily, and an uneven pattern formed with parts of greatly differing levels can be readily stamped on the sheet. The stamped sheet is moved downwardly along the tangential line from the stamping point while being substantially free from tensile force. Accordingly, no unreasonable force is exerted on the stamped sheet, and the uneven pattern stamped thereon is maintained unchanged.

Figure 6:
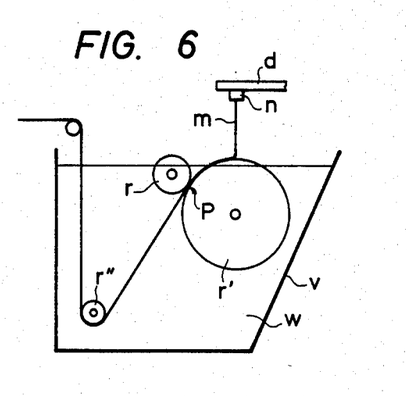

FIG. 6 shows a second example of the stamped sheet formation method according to the invention. Similarly to the first example in FIG. 5, molten plastic material m is extruded out of the slit-shaped nozzle n of a die d, so that it is supplied in the form of a sheet. In this example, the sheet is delivered directly to a drum r' made of rubber and having a smooth outer wall. The sheet enters the liquid refrigerant W while being kept in contact with the outer wall of the drum r', and passes through a gap between the drum r' and an associated uneven stamping roll r on which an uneven pattern is formed, so that the uneven pattern is stamped on the sheet. Therefore, the stamped sheet is moved along a line tangent to the stamping roll r at the stamping point. During this movement, the sheet is sufficiently cooled and solidifed, and is then pulled out of the liquid refrigerant bath v.

In the second example in FIG. 6, the molten plastic material m contacts the outer wall of the roll r' before entering the refrigerant W. Therefore, the method is advantageous in that the width of the sheet is scarcely reduced. It goes without saying that, in the second example, it is essential for the plastic material to move into the refrigerant W immediately after it contacts the outer surface of the roll.

Figure 7:
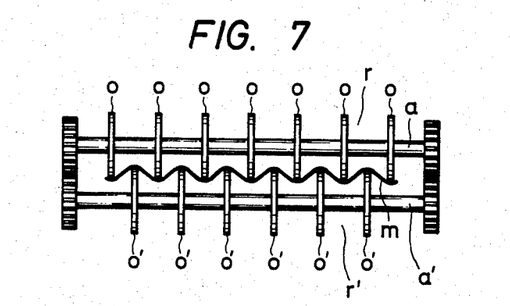
FIGS. 7 and 8 are explanatory diagrams showing examples of a pair of stamping rolls employed in practicing the method of the invention.

FIG. 7 is a front view showing one modification of the stamping rolls r and r' in FIGS. 5 and 6 with the vane-like projections parallel to each other and perpendicular to the axes of the rolls. Rolls according to the modification are intended to provide a wavy stamped sheet having ridges which extend in the longitudinal direction (which is in parallel with the direction of extrusion of molten plastic material). Disks o and o' are fixedly mounted on the rotary shafts a and a' of the stamping rolls r and r', respectively, in such a manner that they are arranged alternatively at equal intervals on the respect rotary shafts. Therefore, the sheet of molten plastic material m is made wavy while passing through the gap between the rolls r and r'.

Figure 8:
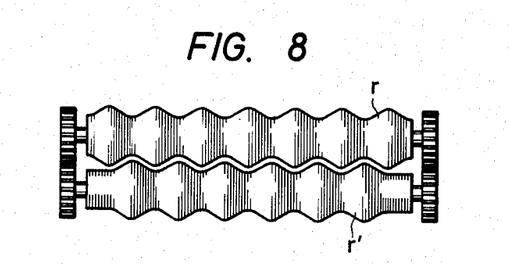

FIG. 8 is a frontview showing another modification of the stamping rolls r and r' in FIGS. 5 and 6. In the modification, the outer walls of the rolls r and r' are formed with a wavy surface. Therefore, the sheet of molten plastic material m is made wavy while passing through the gap between the rolls r and r', similarly to the case in FIG. 7.

The methods of the invention shown in FIGS. 7 and 8 are especially effective in manufacturing a sheet having a wave or rib structure which is extended in the longitudinal direction. Such a sheet is liable to collapse when contacted and bent by a roll or bar. This tendency is more significant when the sheet is brought into contact with a roll or bar before sufficiently solidified. However, in the methods according to the invention, no excessive force is applied to the sheet before the latter is sufficiently cooled and solidifed, and therefore the sheet can be stamped as required.

Figure 9:
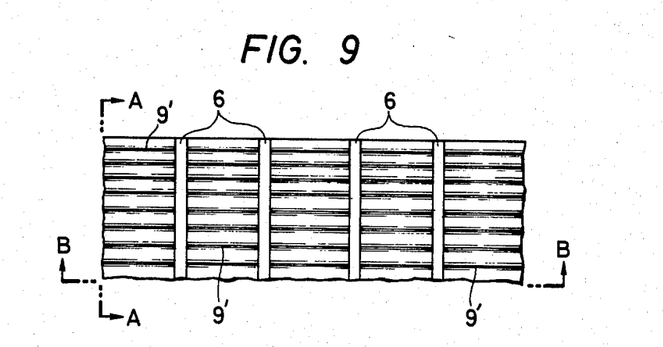
FIG. 9 is a plan view of another example of the shock absorbing sheet according to the invention.
Figure 10:
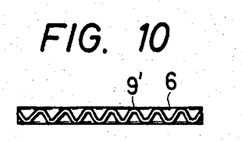
FIGS. 10 and 11 are sectional views of the sheet shown in FIG. 9.
Figure 11:
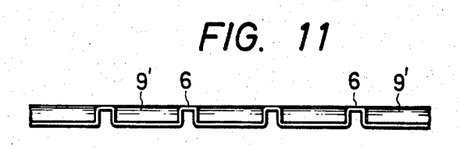

FIG. 9 is a front view of a stamped sheet manufactured with a pair of stamping rolls obtained by forming annular ribs and grooves on a pair of rolls in the circumferential direction. FIG. 10 is a side view of the stamped sheet as viewed in the direction A—A in FIG. 9, and FIG. 11 is also a side view of the stamped sheet, as viewed in the direction B—B.

Figure 12:
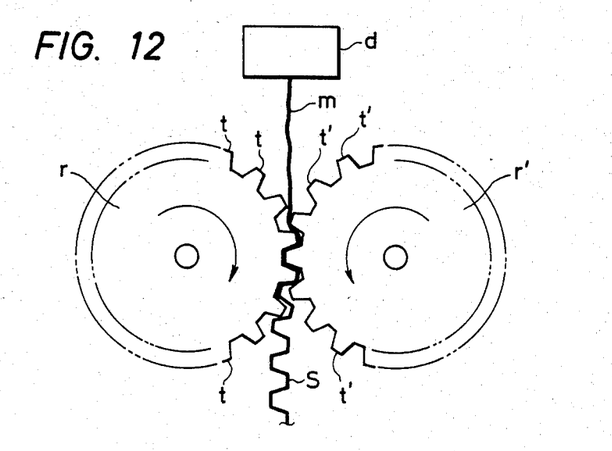
FIG. 12 is a side view outlining a pair of rolls for manufacturing the sheet shown in FIG. 1.
Figure 13A:
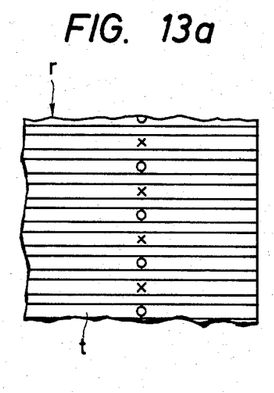
FIGS. 13a and b are explanatory diagrams showing parts of the outer walls of the pair of rolls of FIG. 12.
Figure 13B:
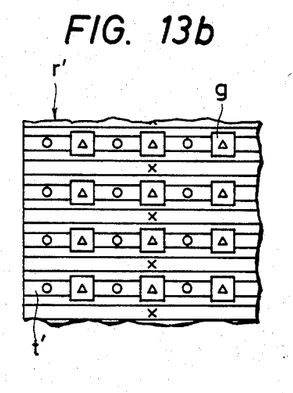

FIG. 12 shows an example of a pair of stamping rolls for manufacturing a sheet having a special uneven pattern by utilizing the aforementioned tensioning action, according to the invention. More specifically, these stamping rolls are used to manufacture the sheet as shown in FIG. 1. The pair of rolls r and r' have teeth t and t' which are engaged with each other as the rolls r and r' turn. As molten plastic material m is supplied into the gap between the rolls r and r' from a die d, a stamped sheet S having a wavy uneven pattern corresponding to the configurations of the teeth is produced. In manufacturing the sheet shown in FIG. 1, the roll r is an ordinary wavy roll as shown in FIG. 13, while shallow recesses g are cut, at regular intervals, in the teeth t' of the other roll r'. Therefore, as the tops and bottoms of the teeth of the two rolls engage, the recessed parts of the sheet, which are shaped by hill parts of rolls r in FIG. 13b, are naturally concavely curved, being free from the influence of the original outer shapes of the rolls r in FIG. 13a. Thus, the sheet is stamped as shown in FIG. 1. This phenomenon occurs as long as a gap exists between the side surfaces of the confronted (engaged) teeth of the rolls. Accordingly, not only the sheets shown in FIGS. 2 and 3, but other sheets having even more complicated uneven patterns can as well be manufactured in the same manner.

The invention will be further described with reference to the following concrete examples:

An extruder (the screw diameter being 40 mm) was used. Under the condition that the number of revolutions per minute of the screw was set to 72 (only 100 in Example 1 described below) various kinds of thermoplastic plastic materials were extruded with a T-die having a slit-shaped nozzle 210 mm in width. The plastic materials were supplied, in molten film form, to a pair of stamping rolls (cf. FIGS. 14 and 15) which were set in water at about 20° to 30° C., to form wavy sheets under the conditions described below:

Roll Data

Type A (FIG. 14) Tooth-like projections parallel to axes of rolls
Circular tooth face (dk): 62 mm
Tooth form: module m=1
Deddendum circle diameter (dr): 57.50 mm
Tooth height (h): 2.25 mm
Number of teeth (z): 60
Type B (FIG. 15) vane-like projections parallel to axes of rolls
Boss outside diameter ($r_1$): 30 mm
Actual vane length (h): 25 mm
Number of vanes: 10 (provided at equal intervals)
Length of the overlap parts of vanes ($h_O$): 15 mm

EXAMPLE 1

Figure 15:
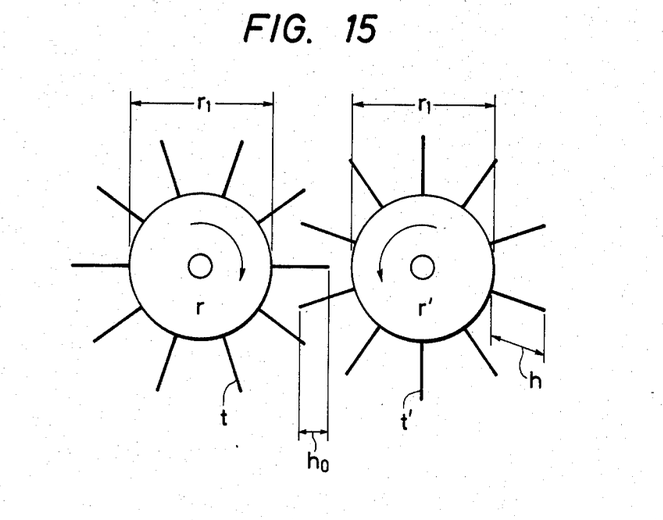
FIG. 15 is a side view outlining a pair of type B rolls as employed in a further example according to the invention.

Polyethylene terephthalate resin was extruded in the form of the film at a resin temperature of 270° C. from a T-die (having a slit gap of 2.0 mm), to manufacture a wavy sheet according to the method shown in FIGS. 5 and 15. Water at 30° C. was employed as the liquid refrigerant. The time interval which elapsed from the instant that the sheet of molten resin went into the water until the sheet was maximumly stamped was about one second, and the period of time that the sheet remained in the water was about twenty-five seconds total. The resultant wavy sheet (having a thickness of about 1 mm) was correctly stamped, and the configuration thereof was high in stability.

EXAMPLE 2

Instead of the polyethylene terephthalate resin in Example 1, polypropylene resin containing 50 wt. % non-organic material (Idemitsu Lion: Calp 1400G ®, MI=2) was extruded in the form of a film from a T-die (having a slit gap of 0.6 mm) with the resin temperature being at 250° C., and under the same conditions as in Example 1, a wavy sheet was manufactured with the stamping rolls in FIG. 14. The resultant wavy sheet was stable in configuration; that is, the configuration of the pattern stamped on the sheet was regular.

EXAMPLE 3

Figure 14:
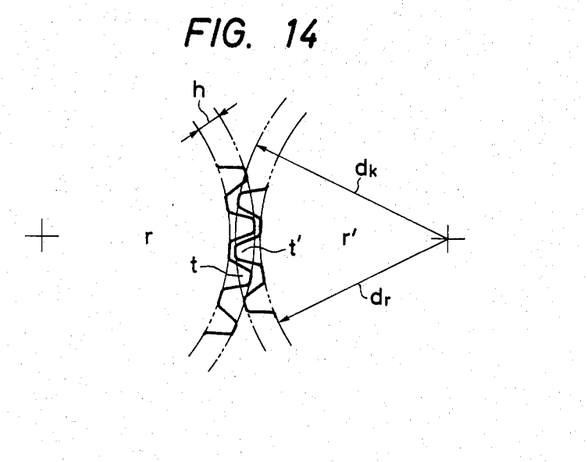
FIG. 14 is a side view showing parts of a pair of type A rolls employed in the invention.

Instead of the polyethylene terephthalate resin in Example 1, ethylene-vinylacetate copolymer resin (containing 10 wt. % vinyl acetate, MI=1.5) having anzofoaming-agent added thereto was extruded in the form of a foamed film from a T-die (having a slit gap of 0.6 mm) at 190° C., so that, under the same conditions as in Example 1, a wavy sheet was formed by using the stamping rolls shown in FIG. 14. The resultant wavy sheet was stable in configuration; that is, the configuration of the pattern stamped on the sheet was regular.

What is claimed is:

1. A method of preparing a stamped sheet by means of a pair of stamping rolls having intermeshing projections disposed in a liquid refrigerant comprising immersing a film-like sheet of molten plastic material having a uniform thickness in said liquid refrigerant to form a skin on the surface of the molten material, immediately passing the molten plastic material having a skin thereon between said stamping rolls, stamping the material to tension the material by engagement of the material with the crests only of the projections while maintaining the uniform thickness of said sheet and removing said sheet from the refrigerant after the interior of the material has been solidified.

2. A method of preparing a stamped sheet as set forth in claim 1 wherein said projections are in the form of parallel elongated tooth like projections having a plurality of regularly spaced recesses along the length thereof.

3. A method of preparing a stamped sheet as set forth in claim 2 wherein said tooth-like projections extend parallel to each other with the crest of each tooth on one roller being positioned to enter a valley between the teeth of the other roll in a non-contacting manner.

4. A method of preparing a stamped sheet as set forth in claim 1 wherein said projections are comprised of flat, elongated vane-like projections which are radially disposed with respect to said rollers.

* * * * *